J. R. FORDYCE.
COTTON GIN.
APPLICATION FILED APR. 2, 1910.

1,039,111.

Patented Sept. 24, 1912.

3 SHEETS—SHEET 3.

Witnesses:
Amelia M. Ross
Marion F. Kimball

Inventor:
John R. Fordyce.
by Robt. F. Hains,
Att'y

UNITED STATES PATENT OFFICE.

JOHN R. FORDYCE, OF LITTLE ROCK, ARKANSAS.

COTTON-GIN.

1,039,111.

Specification of Letters Patent. Patented Sept. 24, 1912.

Application filed April 2, 1910. Serial No. 553,100.

*To all whom it may concern:*

Be it known that I, JOHN R. FORDYCE, a citizen of the United States, residing at Little Rock, in the county of Pulaski and State of Arkansas, have invented an Improvement in Cotton-Gins, of which the following description, in connection with the accompanying drawings, is a specification, like letters on the drawings representing like parts.

The invention to be hereinafter described relates to cotton gins of the saw type and more particularly to the means for detaching the cotton from the saw teeth after it has been pulled from the seed.

The aims and purposes of the present invention are to provide a saw gin with air suction means such that the cotton may be effectually carried from the saw teeth after they have removed the fiber from the seed and passed it toward the rear of the gin and between the gin ribs.

Other characteristics of the invention will appear from the following description and accompanying drawings of one form of means for carrying the invention into practical effect.

Figure 1:
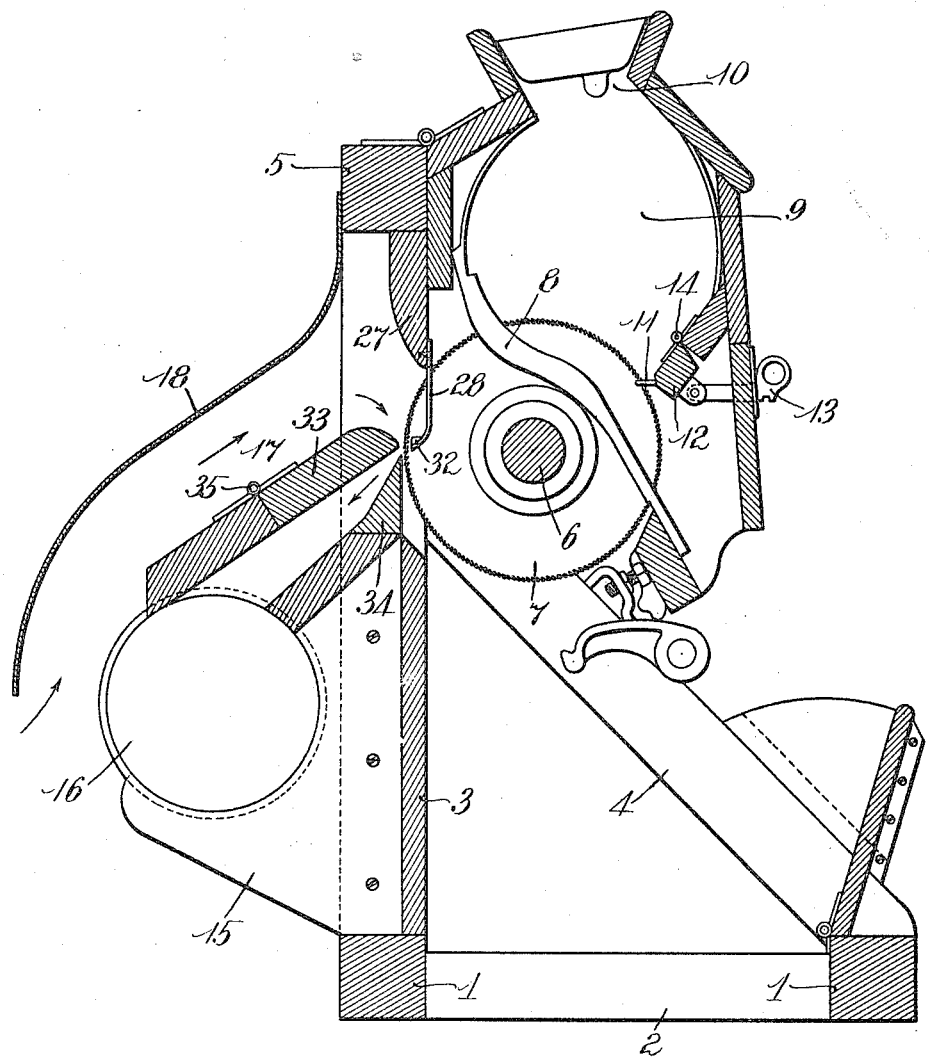
Figure 2:
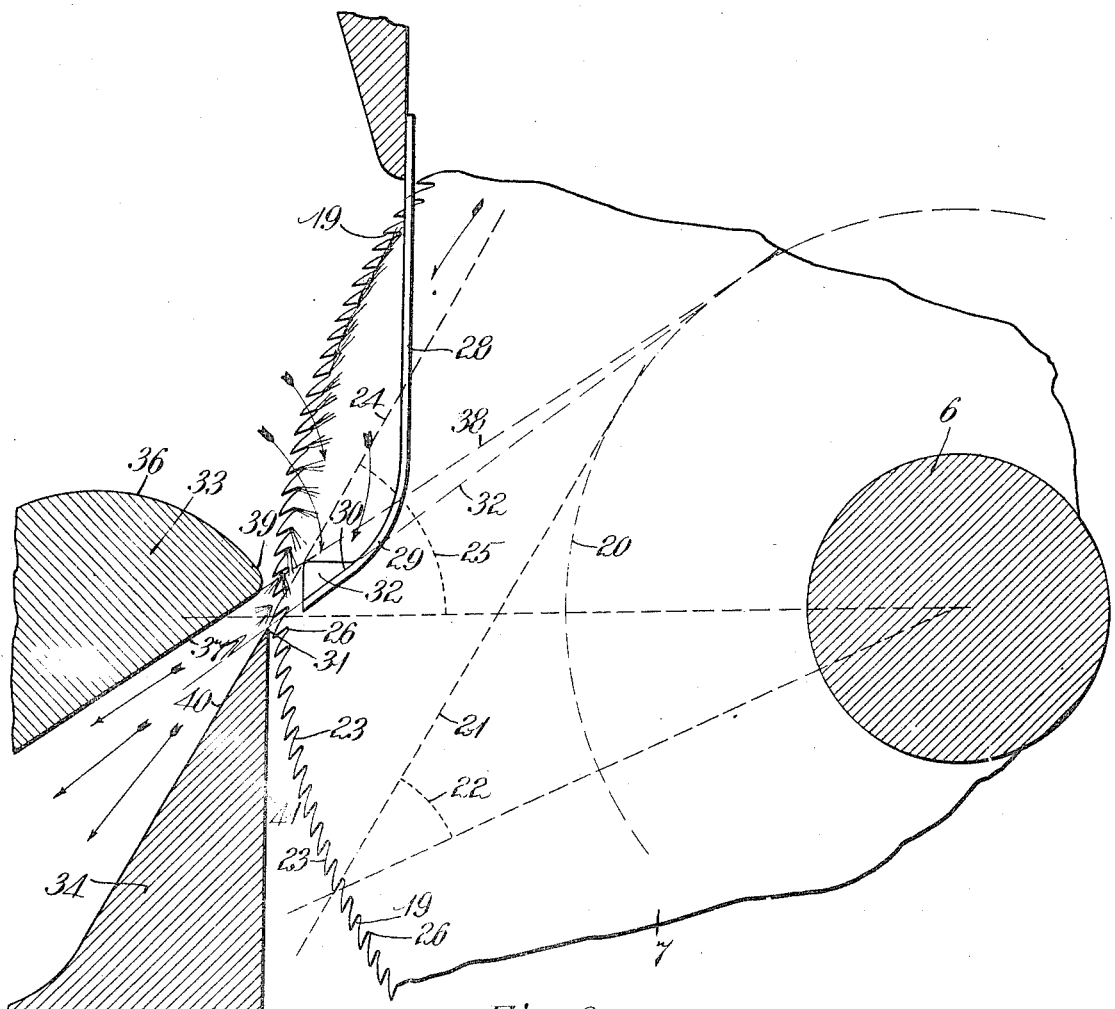
Figure 3:
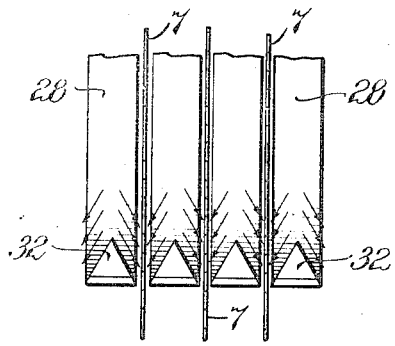
Figure 4:
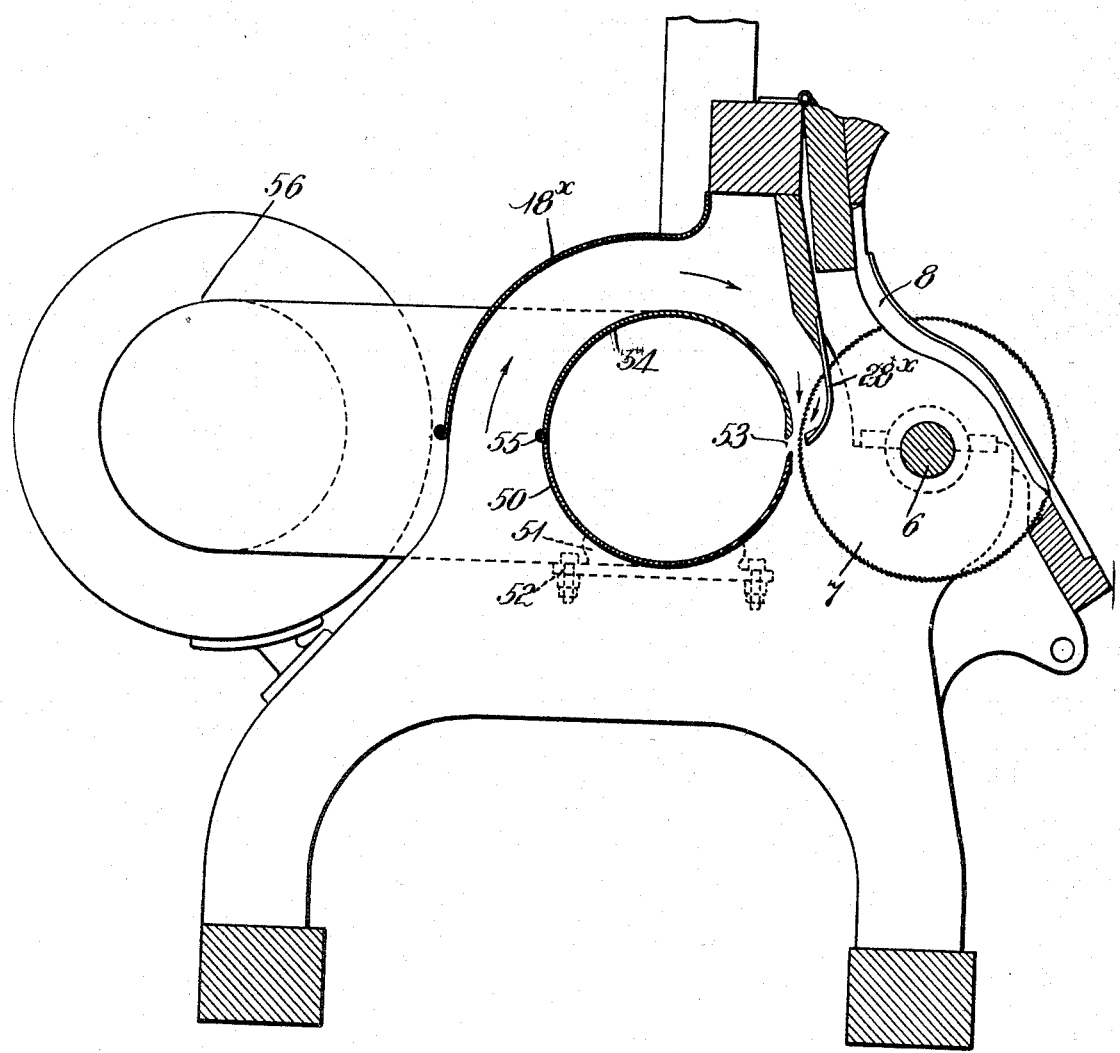

In the drawings:—Figure 1 is a central longitudinal vertical section of a saw gin embodying the present invention; Fig. 2 is an enlarged detail showing more clearly the relation between the saw teeth, the walls of the suction nozzle, the fingers, and associated parts; Fig. 3 is a detached detail looking at the edges of the saws and at the fingers from the rear or left in Fig. 2; and Fig. 4 is a longitudinal sectional elevation of a saw gin equipped with a modified form of air suction device for removing cotton from the saws and carrying it to the desired point.

The frame of the saw gin may be of any usual or desired form or character and is herein shown as comprising the bottom pieces 1, cross pieces 2, suitable uprights 3, braces 4, and top cross piece 5, Fig. 1, it being understood that such form of construction, while practical and convenient, is not an essential of the invention.

Supported on the machine frame is the saw shaft 6, Fig. 1, having mounted thereon a series of saws 7, which pass between the ribs 8 and project into the usual roll box 9, where the teeth of the saws engage the cotton fiber and, by the rotation of the saws, in usual manner, pull such fiber between the ribs toward the rear of the machine.

The roll box 9 is provided with a feed opening 10, and at its bottom portion may, if desired, be provided with the teeth 11, projecting from the bar 12 toward the saws to permit dust and trash to escape at the bottom of the roll box. Preferably, the bar 12 is hinged at 14 and held in desired position by means of the catch 13.

As hereinbefore noted, the cotton fiber, which is engaged by the saw teeth in the roll box and pulled from the seed and other by-products as the saw teeth pass between the ribs 8, passes to the rear of the gin still clinging to the saw teeth. At the same time, some of the dust or dirt, commonly called motes, in the roll box will also pass backward with the saws and cotton. It is desirable that such detached cotton fiber be removed from the saws after having passed between the saw ribs 8 and conducted to a suitable point, such as a condenser. It is likewise desirable that the motes be prevented from passing along with the cotton fiber thus taken from the roll box. With these matters in view, the invention contemplates the provision of means for producing air suction currents in a direction with respect to the saw teeth such that the tufts of cotton carried by the teeth shall be effectually removed therefrom and carried at once into the suction conduit; and the provision of fingers for obstructing the passage of motes and giving direction to the induced air currents, all of which will hereinafter more fully appear.

Supported on the machine frame, as by brackets 15 is a conduit 16 which may be connected to a suitable air suction device, such as a suction fan or the like, not shown; and communicating with the conduit 16 in the form of invention shown by Fig. 1 is a suction nozzle 17, the opening of which is placed closely adjacent the saws, preferably at the rear thereof, and extends transversely of the series of saws.

Secured to the machine frame is a dust hood 18 disposed above the air suction nozzle and extending backward and preferably downward, so that the induced air currents passing into the nozzle opening may be drawn from the rear of the machine and near the floor, if desired, thus maintaining said currents free from dust and dirt and perforce keeping the cotton fiber clean and in good condition.

It has been found in practice that for the best results the saw teeth of the series of saws 7 should be formed with straight faces 19, Fig. 2, preferably cut on lines which if extended inwardly become tangent to a circle, the center of which is the saw axis, and the diameter of which is less than the diameter of the saws. This character of teeth is well indicated by Fig. 2, wherein the dotted curved line 20 represents the tangent circle and the straight dotted line 21 represents the tangent thereto extending along the face 19 of the saw teeth. The diameter of the tangent circle will, of course, vary with variation in the diameter of the saws, but the faces 19 of the saw teeth, for the best results, should make an angle of approximately 35° with a radius of the saw drawn through the end of the saw tooth, as indicated at 22, Fig. 2. The backs 23 of the saw teeth are preferably rounded somewhat, as indicated in Fig. 2, and at the point of the teeth are tangent to a line 24 making an angle of 60° with the radius, as indicated by the dotted line 25. The throats or spaces 26 at the base of and between the teeth are large and rounded so that cotton cannot jam or get wedged so hard that it will not readily be dislodged and detached by the suction currents, as will be hereinafter fully described.

While the particular formation of saw teeth just described has been found to be effective and satisfactory in practice, the invention is not intended to be limited to these precise details, but includes such variations thereof that fairly coöperate with other features of the invention to secure a proper detachment of the fiber from the saw teeth.

Projecting from the cross-piece 27 are a series of fingers 28 preferably formed with curved lower portions 29, Fig. 2, said fingers extending between the saws 7 and by their front surfaces offering an obstruction to the passage of motes into the suction conduit. For the best results, the lower portion 29 of the said fingers are curved toward the inlet opening leading to the suction conduit, and the deflecting portions 30 extend toward the upper edge 31 of the bottom lip of the inlet opening to the suction conduit, as indicated by the line 32 tangent to the circle 20. As will hereinafter more fully appear, these fingers 28 and their deflecting lower ends form, in effect, one wall of an air funnel leading to the suction conduit opening for concentrating and increasing the effect of the inrushing air currents at the most advantageous point and in the most effective direction. At its lower portion, each finger is provided with a wedge shaped piece or block 32, whose purpose is to deflect the induced air currents against the saws adjacent the teeth thereof near the base or cotton bearing portion as they pass the opening to the suction nozzle or conduit.

The nozzle 17 comprises the two members 33 and 34, the upper member 33 being preferably, though not necessarily hinged at 35. The top surface 36 of the nozzle 33 is shaped to form the other wall of the so called funnel leading the induced air currents, as indicated by the arrows, Fig. 2, toward the inlet opening of the suction conduit and serving to augment their effective action in detaching the lint from the saw teeth. The lower or inner surface 37 of the member 33 is preferably formed in a plane which is tangent to the tangent circle 20 and in line with the faces of the saw teeth as they pass the inlet opening, as indicated by the dotted line 38, and at the juncture of the upper and lower surfaces the nozzle is rounded, as at 39.

From the construction thus far described, it will be apparent that while the induced or suction air currents are protected from dust and dirt by the dust hood 18 and may be drawn from the rear of the gin near the floor, if desired, the top surface 36 of the nozzle member 33 in conjunction with the fingers 28 form a directing funnel for the air currents, so that their greatest efficiency is directed over the saw teeth from the base thereof toward the ends and in a line leading directly into the suction conduit.

The upper edge or lip 31 of the lower nozzle member 34 is placed as close to the saw teeth as practical and the plane of the inner surface 40 of said member is preferably 60° with a radial line of the saws and consequently is in direct line with the back of the saw teeth as they approach the edge or lip 31, as will be apparent from Fig. 2. The outer surface 41 of the lower nozzle member is preferably formed at angle of 30° with the inner surface 40, the construction being such that the main effective induced air currents enter the conduit opening from a point above the lip 31 and in a direction to carry the lint or fiber from the saw teeth in an unobstructed path directly into the said opening.

From the construction described, it will be apparent that as the saw teeth, each with its rounded throat filled with cotton fiber, pass the saw ribs, they carry the cotton between the fingers 28 and drop the motes and other waste which loosely follows the saws. During this action, the ends of the fibers held in the throat of the saw teeth are trailing back on each side of the saws, as indicated in Fig. 2, and in this condition the currents of inrushing air formed in the space or funnel between the rear of the fingers and top surface of the nozzle member 33 act with gradually increasing effect toward the inlet opening and upon the ends of the cotton fibers as they move toward the nozzle opening, reversing these ends, substantially as indicated by Fig. 2. Since the narrowest portion of the funnel is at the noz zle opening which is also of small dimensions, the velocity of the inrushing air is greatest just at the point where the nozzle approaches nearest the saws, and when a saw tooth with its load of fiber comes opposite the nozzle opening, its front face is exactly in line with the inner surface of the nozzle member 33 so that the suction currents act to carry the fiber directly and without obstruction from the saw teeth into the nozzle opening. The cotton that may be following the back of the teeth is shot downwardly and has a clear track into the nozzle opening. Moreover, as the teeth pass to the lip of the lower member 34 of the nozzle, the end portions 30 of the fingers and the wedge deflectors 32 act to direct the induced currents against the saws and into the nozzle opening carrying the cotton in an unobstructed path. The wedge pieces 32, as indicated by arrows in Fig. 3, direct the induced currents against the sides of the saws adjacent the base of the saw teeth and the portions 30 of the fingers give directional movement along the tangent line 32 into the nozzle opening.

While the described formation of the saw teeth, the funnel, the fingers, and nozzle constitute a convenient and efficient structure to detach the cotton fiber from the saws and carry it into the suction conduit by concentrating the effective action of the currents in the most favorable directions and with greatest efficiency at the nozzle opening, the invention is not to be considered as necessarily limited to the particular formation and relation of the parts, as changes within the true scope of the invention may readily suggest themselves to those skilled in the art. For instance, in Fig. 4, the suction conduit 50 may be mounted on suitable supports 51 connected to the machine frame by slot and bolt connections 52, whereby, the suction conduit may be adjusted toward and from the saws 7, and instead of having a distinct suction nozzle, as in the form of the invention already described, the suction conduit 50 may have an opening 53 adjacent the saws, and one portion of the conduit, as 54, may be hinged, as at 55, to permit cleaning or the like. In this case the dust hood 18ˣ, the upper wall of the conduit and the fingers 28ˣ may constitute a form of funnel to direct the suction currents in the manner already described. The suction conduit may be connected at one end to the main trunk vacuum pipe 55 by which the cotton is carried to the condenser or other point, as desired.

The general form of the edges or walls of the inlet opening to the conduit and the fingers with their wedge deflectors may be substantially as described with reference to the preferred form of the invention.

While the funnel which leads the induced currents to the contracted opening of the nozzle or conduit is conveniently formed by the fingers and upper member of the nozzle or conduit, it is to be understood that it may be otherwise formed, the essential in this respect being that it shall act to direct the induced air currents with gradually increasing effect in a general direction leading from the base of the saw teeth toward their points as said teeth pass the inlet opening, the true scope of the invention being definitely set forth by the claims.

What is claimed is:—

1. In a saw gin employing suction currents for removing cotton from the saws, the combination of a series of saws, a suction conduit having an inlet thereto adjacent the periphery of the saws, and a dust hood extending above the suction opening of the conduit and leading rearwardly and downwardly for directing the suction currents free of dust into the inlet of the suction conduit.

2. In a saw gin employing suction currents for removing cotton from the saws, the combination of a series of saws, a suction conduit having an inlet opening, and a series of fingers extending between said saws and constituting one wall of a gradually contracting air passage leading to the inlet opening of the suction conduit, said suction conduit having a portion constituting the other wall of the air passage.

3. In a saw gin employing suction currents for removing cotton from the saws, a suction conduit having an inlet opening adjacent the periphery of the saws, an air conduit gradually contracting toward the inlet opening of the suction conduit in the direction of saw movement to direct induced air currents with gradually increasing effect toward the said inlet of the suction conduit, and a dust hood to prevent dust and dirt entering the zone of induced currents.

4. In a saw gin employing air suction currents for removing cotton from the saws, the combination of a series of saws, a suction conduit for inducing suction currents over the saws and having an inlet opening adjacent the periphery of the saws, said opening being contracted to augment the force of the induced currents as they enter said opening, and a series of fingers extending between the saws and having portions extending in a plane toward the inlet opening of the nozzle for directing induced currents toward the said inlet opening.

5. In a saw gin employing air suction currents for removing cotton from the saw teeth, the combination of a series of saws, a suction conduit having an inlet adjacent the rear portion of the periphery of the saws, and a series of fingers extending between the saws at the rear portion thereof, said fingers and a wall of said inlet having portions converging toward the said inlet and forming a gradually diminishing air passage to direct the induced currents.

6. In a saw gin employing air suction currents for removing cotton from the saw teeth, the combination of a series of saws, a suction conduit having an inlet adjacent the periphery of the saws, and a series of fingers extending between the saws, said fingers and a wall of said inlet having portions converging toward the said inlet and forming a gradually diminishing air passage to direct the induced currents with increased energy as they approach the inlet of the suction conduit, said fingers being provided with deflecting portions to deflect such currents of increased energy against the sides of the saws.

7. In a saw gin employing air suction currents for removing cotton from the saws, the combination of a series of saws, a suction conduit having an inlet opening for induced air currents and the cotton fiber detached from the saws, and a series of fingers extending between the saws and having portions deflected toward the inlet opening of the suction conduit into planes parallel to the axis of the saws.

8. In a saw gin employing air suction currents for removing cotton from the saws, the combination of a series of saws, a suction conduit having an inlet opening at the rear of the saws for induced air currents and the cotton fiber detached from the saws, and a series of fingers extending from above and between the saws and having portions curved toward the said inlet opening into planes intersecting the peripheries of the saws and provided with side deflectors.

9. In a saw gin employing air suction currents for removing cotton from the saws, the combination of a series of saws, a suction conduit having an inlet opening for induced air currents and the cotton fiber detached from the saws, and a series of fingers extending between the saws and over the said inlet opening, the said fingers having their portions adjacent said opening deflected toward the same into planes extending in the direction of the longitudinal dimension of the inlet opening.

10. In a saw gin employing air suction currents for removing cotton from the saws, the combination of a series of saws, a suction conduit having an inlet opening for induced air currents and the cotton fiber detached from the saws, and a series of fingers extending over the said inlet opening and having the portion adjacent thereto extending in a plane substantially parallel to the plane of the front faces of the saw teeth as they pass said opening.

11. In a saw gin employing air suction currents for removing cotton from the saws, the combination of a series of saws, a suction conduit having an inlet opening for induced air currents and the cotton fiber detached from the saws, a series of fingers extending over the said inlet opening and having the portion adjacent thereto extending in a plane substantially parallel to the plane of the front faces of the saw teeth as they pass said opening, and wedge portions on said fingers to deflect air currents against the sides of the saws.

12. In a saw gin employing suction currents for removing cotton from the saws, the combination of a series of saws, and a suction conduit having an inlet opening near the periphery of the saws for the entrance of induced currents and cotton fiber, the inner surface of the wall of said inlet opening first passed by the saw teeth as the saws revolve being substantially parallel to the forward faces of the saw teeth as they pass the same.

13. In a saw gin employing suction currents for removing cotton from the saws, the combination of a series of saws, and a suction conduit having an inlet opening near the periphery of the saws for the entrance of induced currents and cotton fiber, the inner surface of the wall of said inlet opening approached by the teeth after passing the other surface of said opening being substantially parallel to the backs of the saw teeth as they pass the same.

14. In a saw gin employing suction currents for removing cotton from the saws, the combination of a series of saws, and a suction conduit having an inlet opening near the periphery of the saws for the entrance of induced currents and cotton fiber, the teeth of the saws being formed with their front faces parallel to the inner surface of the upper member of the inlet opening and with their rear faces rounded from the point toward the base of the teeth.

15. In a saw gin employing suction currents for removing cotton from the saws, the combination of a series of saws, a suction conduit having an inlet opening near the periphery of the saws for the entrance of induced currents and cotton fiber, and a series of fingers extending between the saws and having their lower portions turned toward the lower lip of the said inlet opening into planes intersecting the peripheries of the saws.

In testimony whereof, I have signed my name to this specification, in the presence of two subscribing witnesses.

JOHN R. FORDYCE.

Witnesses:
A. G. CRAWFORD,
W. L. TERRY, Jr.